United States Patent
Potlapally et al.

(10) Patent No.: US 9,275,248 B1
(45) Date of Patent: Mar. 1, 2016

(54) UPDATING PROCESSOR MICROCODE (71) Applicant: Amazon Technologies, Inc., Reno, NV (US)

(72) Inventors: Nachiketh Rao Potlapally, Arlington, VA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/766,200

(22) Filed: Feb. 13, 2013

(51) Int. Cl.
*G06F 21/56* (2013.01)
*G06F 21/62* (2013.01)

(52) U.S. Cl.
CPC .................................. *G06F 21/6218* (2013.01)

(58) Field of Classification Search
CPC .................................................. G06F 21/6218
USPC .................................................. 713/189, 191
See application file for complete search history.

(56) References Cited

U.S. PATENT DOCUMENTS

| | | | |
|---|---|---|---|
| 5,659,801 A * | 8/1997 | Kopsaftis | 710/62 |
| 2006/0143209 A1* | 6/2006 | Zimmer et al. | 707/101 |
| 2007/0074199 A1* | 3/2007 | Schoenberg | 717/168 |
| 2014/0164789 A1* | 6/2014 | Kaplan | 713/191 |

* cited by examiner

*Primary Examiner* — Jason K Gee (57) ABSTRACT

Approaches are described for updating code and/or instructions in one or more computing devices. In particular, various embodiments provide approaches for updating the microcode of one or more processors of a computing device without requiring a restart of the computing device and without disrupting the various components (e.g., applications, virtual machines, etc.) executing on the computing device. The microcode updates can be performed on host computing devices deployed in a resource center of a service provider (e.g., cloud computing service provider), where each host computing device may be executing a hypervisor hosting multiple guest virtual machines (or other guest applications) for the customers of the service provider.

22 Claims, 8 Drawing Sheets

UPDATING PROCESSOR MICROCODE

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In these environments, it may be difficult for a cloud computing provider or operator to ascertain the tasks and/or availability requirements for a widely disparate and/or independent customer base. As complexity and/or needed computing power increases over time, so does the incidence of events requiring updates to the computing resources used to provide that computing power. Such updates may include patching of security flaws, software bug fixes and the like. When such resources and associated software are shared amongst a plurality of simultaneously connecting customers via hypervisors or other types of virtualization software layers, interruption of the resources to install such updates may be undesirable or otherwise difficult to coordinate without significantly impacting customer experience. Furthermore, certain types of updates may need to be performed at the hardware level, such as a processor's microcode, in order to fix potential software bugs or security flaws.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for updating code and/or instructions in one or more computing devices. In particular, various embodiments provide approaches for updating the microcode of one or more processors of a computing device without requiring a restart of the computing device and without disrupting the various components (e.g., applications, etc.) executing on the computing device. In some embodiments, the microcode updates (e.g., patches, replacement instructions, etc.) can be performed on a host computing device deployed in a resource center of a service provider (e.g., cloud computing service provider), where the host computing device may include a hypervisor hosting multiple guest virtual machines (or other guest applications) to provide a multitenant computing environment to host services for the customers of the service provider.

Conventionally, in modern microprocessors (e.g., AMD, Intel), an instruction is implemented as a collection of lesser complexity instructions known as microcode. A hardware decoding unit inside a processor translates each instruction to be executed, into microcode and dispatches the microcode for execution on processor hardware. Within the processor, microcode corresponding to each instruction is programmed into an on-chip non-volatile read-only memory (ROM). For practical purposes, the microcode may be considered equivalent to processor hardware, and has significant control over processor operation. This provides the ability for microcode patches to fix certain types of security bugs and other software/hardware malfunctions.

In accordance with various embodiments, in order to correct such software/hardware bugs or otherwise modify processor execution, the processor of the computing device can allow microcode to be updated by using a patching mechanism. To update the microcode of a processor on a computing device, the computing device may first receive a microcode patch from a trusted source, such as over a network connection, a USB connection, using a console, or the like. Once the microcode patch is received, all active program execution of the processor may be halted (i.e., suspended for a period of time) such as by entering a system management mode (SMM), native processor debugging mode, or some other isolated execution mode on the computing device. For example, in response to detecting a system management interrupt (SMI), the computing device may suspend the execution of all logical cores in the processor. Once the execution has been suspended, the computing device may authenticate the microcode patch, such as by reading the contents of the patch into memory (e.g., SMRAM) and validating a signature of the received patch. Once the microcode patch is authenticated, the microcode patch is applied to the processor and the processor may resume execution. In various embodiments, the microcode patch may contain a set of replacement microcode instructions that are to replace a portion of the processor's native microcode.

In various embodiments, the microcode patch may be signed and/or encrypted using a secure key or several keys.

For example, in some embodiments, the service provider or processor manufacturer may sign the microcode patch by using a private key before providing the patch to the computing device. When applying the patch, the computing device may utilize a public key to validate the signature of the microcode patch in order to ensure that the patch was created by the appropriate entity. In some embodiments, the public key used to verify the signature of the microcode patch may be written into the processor such as into programmable read-only memory (PROM), field programmable read-only memory (FPROM), one-time programmable non-volatile memory (OTP NVM) or erasable programmable read-only memory (EPROM). In other embodiments, the public key may be stored in a trusted store on a computing device, such as a trusted platform module (TPM). If the public key is stored in the TPM, the processor may further include a second key used to verify the public key stored in the TPM. This may eliminate the requirement of permanently writing the public key into the processor and provide some flexibility in the event the key is ever leaked or otherwise compromised. In yet other embodiments, the public key may be stored on a remote device, such as a centralized trusted host computing device in the multitenant computing environment (e.g., in the resource center) of the service provider.

In some embodiments, the microcode patch may also be encrypted using a public key in order to ensure that the patch is not readable by any parties that do not have access to the private key. In these embodiments, the private key used to decrypt the patch may also be written onto the processor, stored in a trusted store, or stored on a remote trusted host computing device, as previously described. In yet other embodiments, the patch may be encrypted and decrypted using symmetric cryptography, such as by using a shared secret key.

Once the microcode patch is received from a remote host or other such trusted source, the microcode patch can be stored in an on-chip volatile random access memory (RAM) or other portion of memory on the computing device. In some embodiments, the microcode patches are wiped out on a processor reset. Thus, in these embodiments, the patches do not have the ability to make persistent changes to processor operation, and may need to be re-applied on every processor reset. This can also provide the advantage that a microcode patch cannot permanently damage a processor in case of some errors.

If the host computing device is able to authenticate the microcode patch (e.g., verify the signature of the microcode patch), it can apply the patch to the processor. The microcode patch may include a set of replacement instructions and an instruction pointer that indicates where those replacement instructions should be applied. For example, the instruction pointer could specify that the patch should replace instructions X to X+100 (where X is a memory address containing the native microcode instructions). In various embodiments, applying the patch may not actually overwrite the native instructions in memory. Rather, the patch can be decrypted and placed in memory (e.g., on-chip RAM) and any time during execution, when the microcode decoder looks up the instructions in the address specified by the pointer, the decoder jumps to the sequence of replacement microcode instructions stored in RAM rather than reading the native microcode in the processor.

Figure 1:
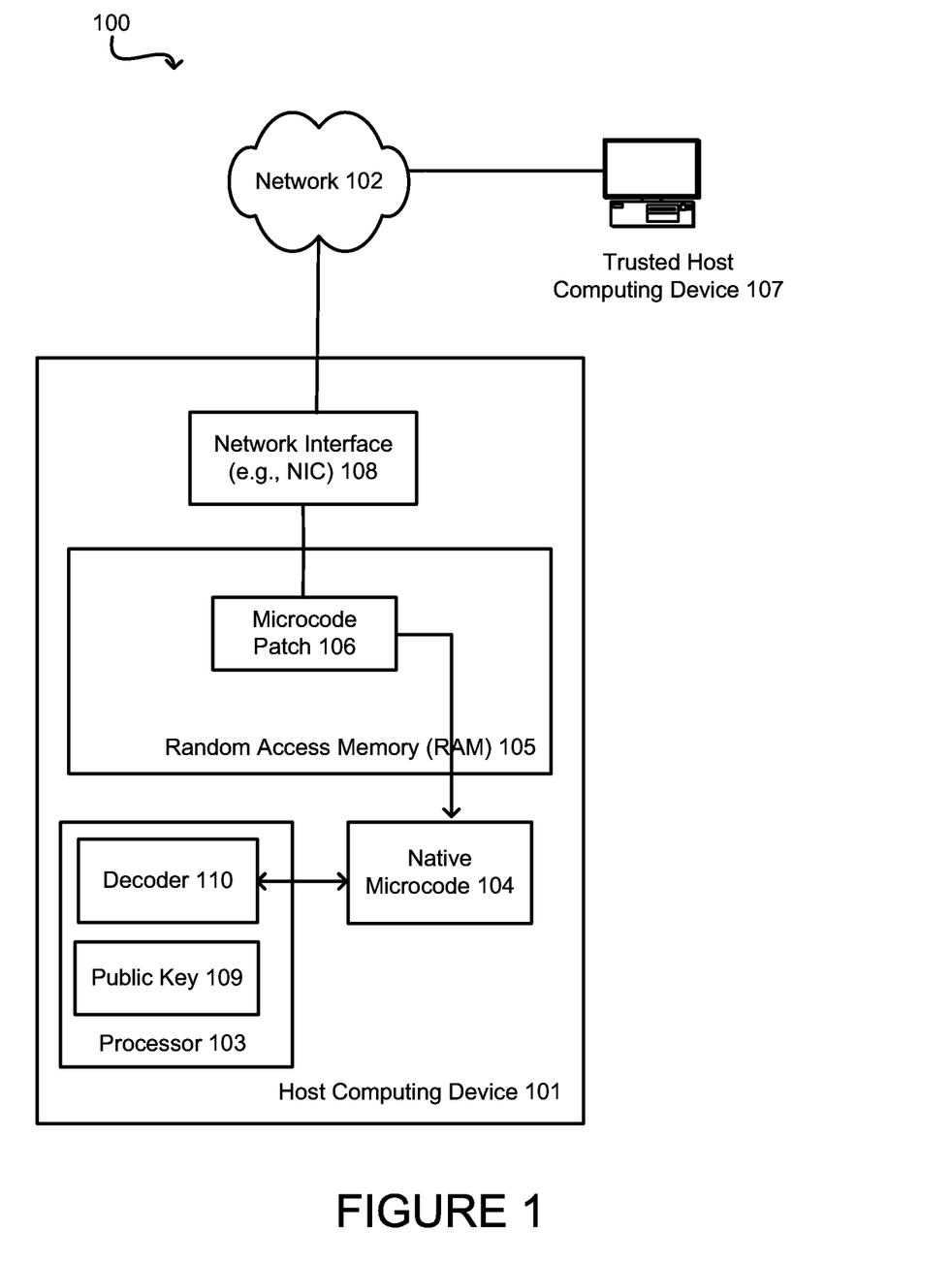
FIG. 1 illustrates an example of updating the microcode of a processor on a computing device, in accordance with various embodiments.

FIG. 1 illustrates an example 100 of updating the microcode of a processor on a computing device, in accordance with various embodiments. In the illustrated embodiment, the host computing device 101 includes one or more processors, such as processor 103 and memory, such as random access memory (RAM) 105. The processor 103 is associated with a set of native microcode 104 for executing higher level instructions that are stored in the RAM 105 of the computing device. A decoder 110 inside the processor 103 translates every higher level instruction to be executed into a sequence of multiple simpler microcode instructions and dispatches the microcode for execution on processor hardware. To translate an instruction, the decoder 110 looks up the sequence of microcode that is stored in special high speed memory (e.g., cache, other designated location, etc.) and replaces the instruction in the execution path of the processor with the sequence of microcode.

In certain situations, it is desirable to modify or update the microcode of the processor 103. For example, it is possible that some security vulnerabilities discovered in cloud-based hosts cannot be easily mitigated with regular software patches, or even patches to the hypervisor or operating systems of the computing device 101. In such cases, patching the underlying microprocessor hardware or the microcode can be very effective in fixing such security issues. In the illustrated embodiment, a microcode patch 106 can be delivered and applied to a computing device, such as a cloud-based host computing device 101, in order to fix certain types of security issues without disrupting any customer components running on the host computing device.

To update the microcode of the host computing device 101, the host computing device can receive a microcode patch or other update from a trusted source and enter a system management mode (SMM), such as be receiving a system management interrupt (SMI) to interrupt normal hypervisor execution. Entering SMM causes the execution of all the physical processor cores except for a single physical core (e.g., the bootstrapping core) in the processor to be suspended. The single physical core that remains executing will be responsible for applying the microcode patch. In alternative embodiments, the host computing device can enter a native processor hardware debugging mode, such as joint test access group (JTAG), test access port (TAP), probe mode or other isolated execution mode. In some embodiments, it may be ensured that the processor 103 finishes executing all of the microcode for the particular instruction that it was executing at the time of detecting the SMI or other interrupt signal before suspending the execution of the physical cores.

In order to receive the microcode patch, the host computing device 101 can connect to a trusted source, such as a remote trusted host computing device 107 over a network connection, such as a network interface 108 (e.g., network interface card (NIC)). The network 102 may, for example, be a local network, a public network such as the Internet, a wide area network, a wireless and/or mobile network, a distributed computing system with a plurality of network nodes and/or the like. The entities connected to the network may include any device that is capable of connecting with the host computing device, including at least servers, laptops, mobile devices such as smartphones or tablets, distributed computing systems and components thereof (including abstracted components such as virtual machine (VM) instances) and/or other types of computing devices and/or components.

The host computing device 101 can receive, from the trusted host 107, a microcode patch 106 or other update or modification to the native microcode of the processor 103. The microcode patch 106 can include a set of replacement instructions for replacing one or more native microcode instructions 104 of the processor 103. For example, the microcode patch 106 written to RAM 105 may contain an instruction pointer (or other indication) that specifies the memory addresses of the native microcode instructions that are to be updated (e.g., replaced), as well as the replacement microcode instructions.

In accordance with various embodiments, the received microcode patch 106 can be signed and/or encrypted by a trusted source, such as the service provider or the processor manufacturer. For example, the microcode patch 106 can be signed using a private key of the service provider (or other trusted entity) in order to ensure authenticity of the microcode patch. If the patch is signed using a private key, the host computing device may need to validate the signature of the microcode patch 106 before applying the patch to the native microcode of the processor 103. In one embodiment, the signature of the microcode patch can be validated using a public key 109 that is written onto the processor 103, such as by "burning" the public key 109 into the processor during its production, or otherwise writing the public key 109 into the processor. In some embodiments, rather than directly using the public key 109 of the processor 103 to verify the microcode patch 106, the key 109 can be used to a verify another key, where the other key is used to decrypt the microcode patch. This may provide the advantage of not having the actual key to verify the patch permanently written onto the hardware of the processor 103, such that if the key is ever compromised, the processor 103 may continue to be used. In some embodiments, the public key used to verify the signature may be stored on a trusted platform module (TPM) on the host computing device. In other embodiments, the public key used to verify the signature of the microcode patch may be stored on a remote centralized trusted host computing device in the multitenant computing environment. The centralized trusted host can provide various cryptographic services and computations for all of the other hosts in the distributed multitenant computing environment. For example, the trusted host computing device may generate strong keys for each requesting host computing device. In some cases, the host computing device may contact the trusted computing host over a secure network channel, such as by using a network interface card (NIC) that has out-of-band (OOB) networking capability, in order to obtain the public key(s) that can be used to verify the microcode patch.

In some embodiments, the microcode patch 106 can also be encrypted using asymmetric or symmetric cryptography. For example, the microcode patch may be encrypted using a public key in order to ensure privacy of the microcode patch. If the microcode patch 106 is encrypted, then any intermediate parties that may handle the patch 106 cannot read the patch or ascertain its contents unless they have access to the private key used to the decrypt the patch. If the patch 106 is encrypted, then the private key to decrypt the patch can be written onto the processor 104, similarly to the public key for verifying the patch, as previously described. For example, the private key to decrypt the patch 106 can be permanently written into the processor 103. Alternatively, the private key burned into the processor 103 can be used to verify another private which can in turn be used to decrypt the microcode patch 106.

Once the microcode patch 106 is authenticated and/or decrypted, the patch 106 can be applied to the host computing device 101. If SMM is used to apply the microcode patch, then the instructions to apply the microcode patch can be implemented in an SMI handler, or SMI handler can cryptographically verify and call a microcode patch function preconfigured in a hypervisor. In the event that a processor debugging mode is used, the native debugging functions can be used to apply the microcode patch 106.

In accordance with an embodiment, applying the patch may instruct the decoder 110 to jump to the replacement microcode when decoding certain instructions. For example, as previously described, the microcode patch may include a set of replacement instructions and an instruction pointer that indicates where those replacement instructions should be applied. For example, the instruction pointer could specify that the patch should replace instructions at memory addresses X to X+100, where X denotes a particular memory address storing the native microcode. When the decoder 110 looks up the microcode instructions in the address, the decoder 110 would jump to the sequence of replacement microcode instructions stored in RAM 105 rather than reading the native microcode 104 of the processor 103.

Once the microcode patch 106 has been applied, the patched host computing device 101 resumes execution from the point where the processor 103 was interrupted. In various embodiments, the resuming of execution can be based on the edge of instruction, such as indicated by the program counter (PC) or instruction pointer (IP). For example, if at the time of entering SMM, the processor completed executing all of the microcode for instruction X, then resuming execution would start the executing the microcode for instruction X+1. In some alternative embodiments, if the isolated execution mode interrupted execution of microcode for a particular instruction, the processor may resume execution by restarting the microcode sequence for that particular instruction.

In some embodiments, because the microcode patches are stored in an on-chip volatile RAM, the patch may be erased upon rebooting the processor 103. Thus, in one embodiment, the microcode patch 106 does not have an ability to make persistent changes to processor operation, and would need to be applied on every processor reset. In this embodiment, upon every power failure or re-boot, the host computing device 101 would need to re-apply the microcode patch 106 (as well as any other active microcode patches) again. This can be done by the BIOS, or by reading the patches into memory from a trusted host over a network connection, or the like. For example, on power reboot, the microcode patch 106 can be re-applied during the boot cycle, such as before thread 0 is able to boot the processor (e.g., in the bootstrap process).

Figure 2:
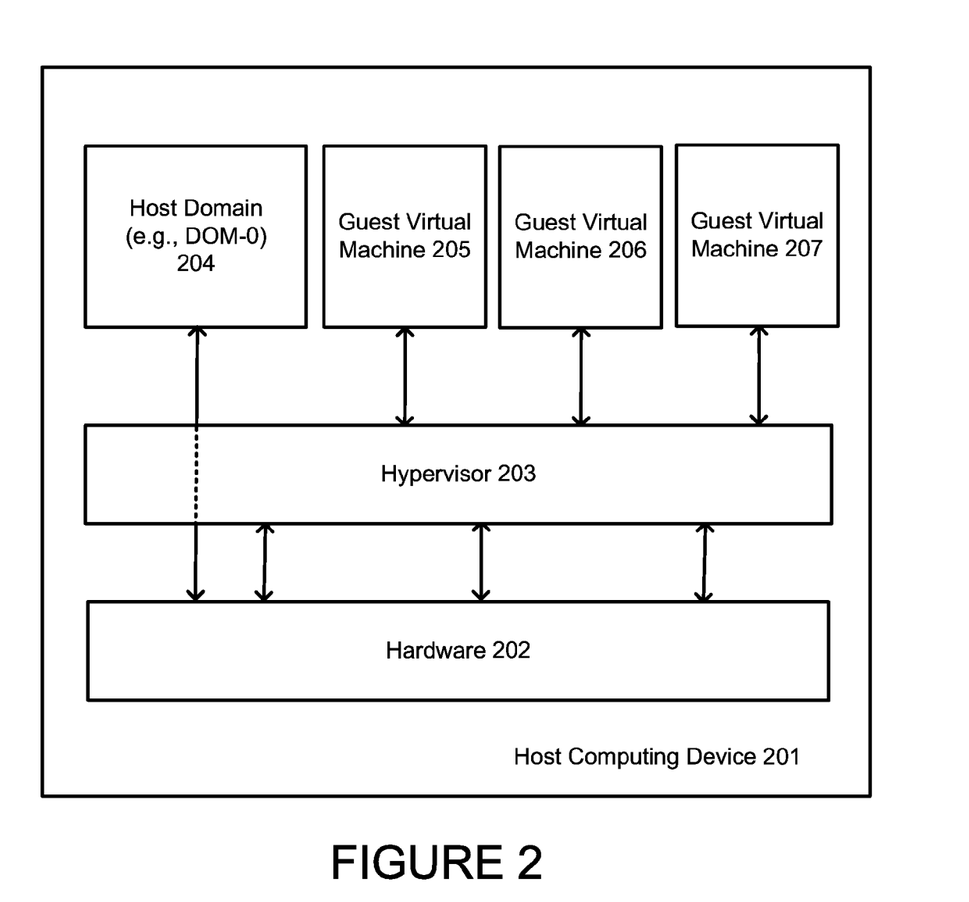
FIG. 2 illustrates an example of utilizing one virtualization technique using a hypervisor, in accordance with various embodiments.

As previously mentioned, the host computing device 101 may be deployed in a resource center of a service provider to provide cloud computing services to one or more customers. A number of virtualization techniques can be used to simultaneously operate a plurality of guest virtual machines or guest operating systems. FIG. 2 illustrates an example 200 of utilizing one virtualization technique using a hypervisor, in accordance with various embodiments. The hardware 202 of the host computing device 201 interfaces with a hypervisor 203 running directly on the hardware 202 (e.g., a "bare metal" or native hypervisor). Examples of such hypervisors include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 204 that may include an administrative operating system for configuring the operation and functionality of the hypervisor 203, as well as that of domains of lower privilege, such as the domains of the guest virtual machines (205, 206, 207) or other operating systems, which may be heterogeneous (e.g., running different operating systems than each other). The host domain 204 (e.g., DOM-0) may have direct access to the hardware resources 202 of the host computing device 201 by way of the hypervisor 203, while the guest virtual machine domains (205, 206, 207) may not.

As will be understood to one of ordinary skill in the art, updates to the microcode of a processor of the host computing device 201 may affect some or all of the domains that are executed by that processor. Similarly, a security threat shared amongst multiple virtualization layers may apply to some or all of the guest operating systems, administrative operating systems, and/or the hypervisor 203. Thus, an entity connected to the hardware of the host computing device 201 may bootstrap the update techniques described in connection with the various portions of this disclosure on or across all affected domains. For example, an SMI can be issued or execution can be otherwise interrupted on all processors (e.g., CPUs) associated with a given host computing device and the microcode patch can be applied to those processors. This can enable the host computing device to fix various security threats, software bugs or otherwise modify processor execution of the host computing device.

In accordance with various embodiments described herein, the processor microcode can be updated on the host computing device 201 without restarting the host computing device 201 and without resetting the hypervisor 203 or the various guest virtual machines (205, 206, 207) running thereon. When the execution of one or more processors is suspended on the host computing device 201, the normal execution of the hypervisor and virtual machines is consequently paused and resumed whenever normal processing of the hypervisor resumes. As such, neither the hypervisor, nor the virtual machines need to be restarted in order to apply the microcode patch.

Figure 3:
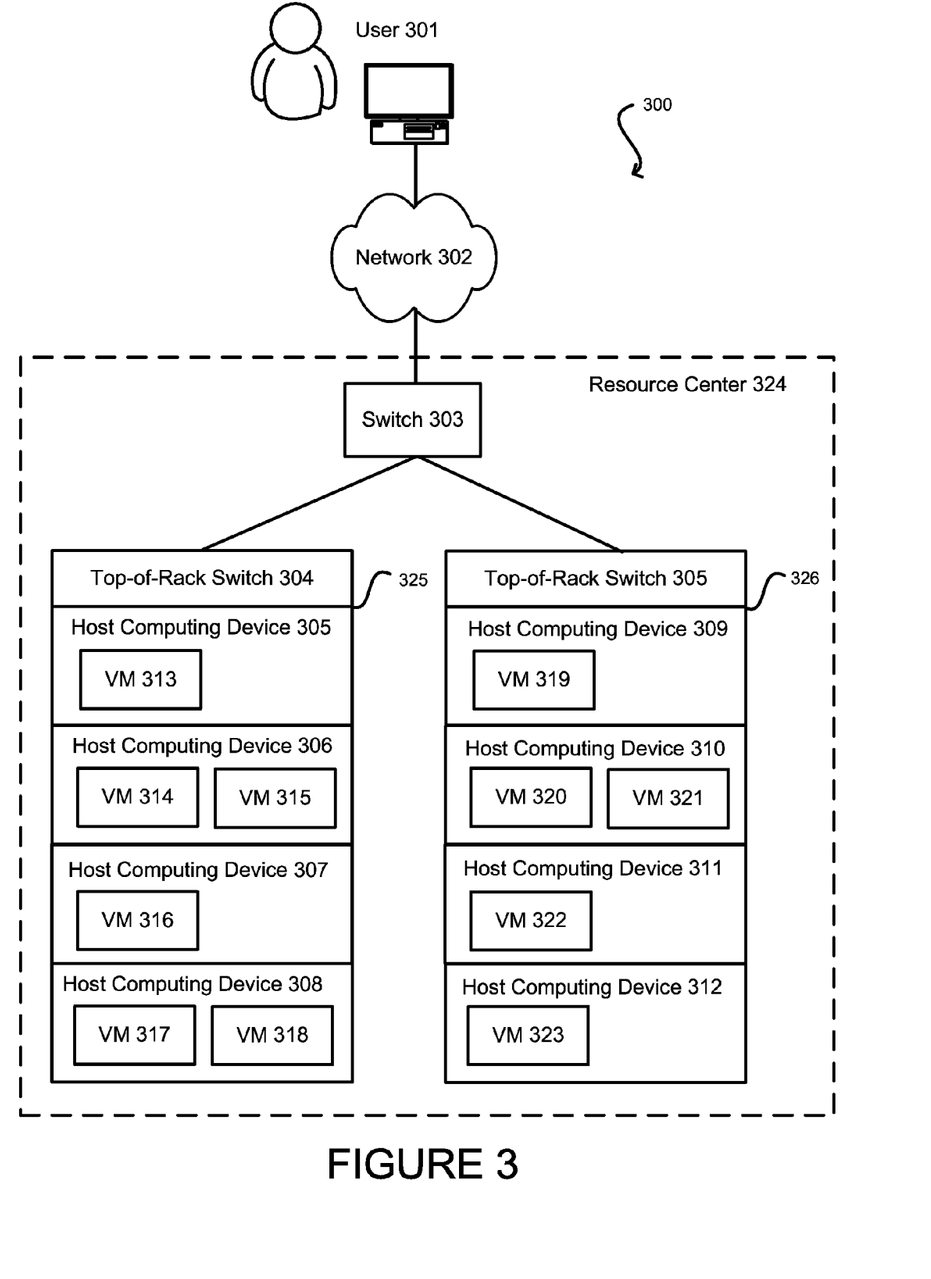
FIG. 3 illustrates an example of a resource center environment of the service provider, in accordance with various embodiments.

FIG. 3 illustrates an example 300 of a resource center environment of the service provider, in accordance with various embodiments. In the illustrated embodiment, a service provider (e.g., a cloud computing resource provider) can maintain one or more resource centers 323 (e.g., data centers, server farms, etc.) that store the physical resources (e.g., host computing devices, etc.) of the service provider. These physical resources can be used to host a number of guests (e.g., virtual machine instances) that can be provided to users 301 over a network 302, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like.

In the illustrated example, the resource center 323 of the service provider may include one or more racks 321, 322 of host computing devices (306, 307, 308, 309, 310) wherein each host computing device on a particular rack is connected to a single top-of-rack (TOR) switch (304, 305). These TOR switches can be further connected to one or more other switches (324, 325) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can include a virtualization layer (e.g., a hypervisor in combination with a Dom-0) that is used to host one or more guests (e.g., virtual machine instances (313, 314, 315, 316, 317, 318, 319)) that have been provisioned for the customers of the service provider to execute the various applications and services on behalf of those customers. Each guest (e.g., virtual machine) can be provisioned with its own operating system (OS) including a kernel, drivers, process management and the like.

When a customer wishes to obtain a virtual machine instance, the customer can first submit a request to the service provider, indicating the type of guest (e.g., VM) they would like to use. The service provider may carry out the processes to provision the guest which will be hosted on the physical resources (e.g., host computing devices) of the service provider. The guest can then be used to execute the various applications and services on behalf of the customer, utilizing the resources of the service provider.

In accordance with an embodiment, once the guest is up and running, a modification may need to be applied to a host computing device in order to fix a bug or otherwise modify a component running thereon. In some cases, fixing the bug may require modification to the microcode of the processor on the host computing device. In various embodiments, the microcode of the processor on the host computing device may be updated using the techniques described throughout this disclosure.

Figure 4A:
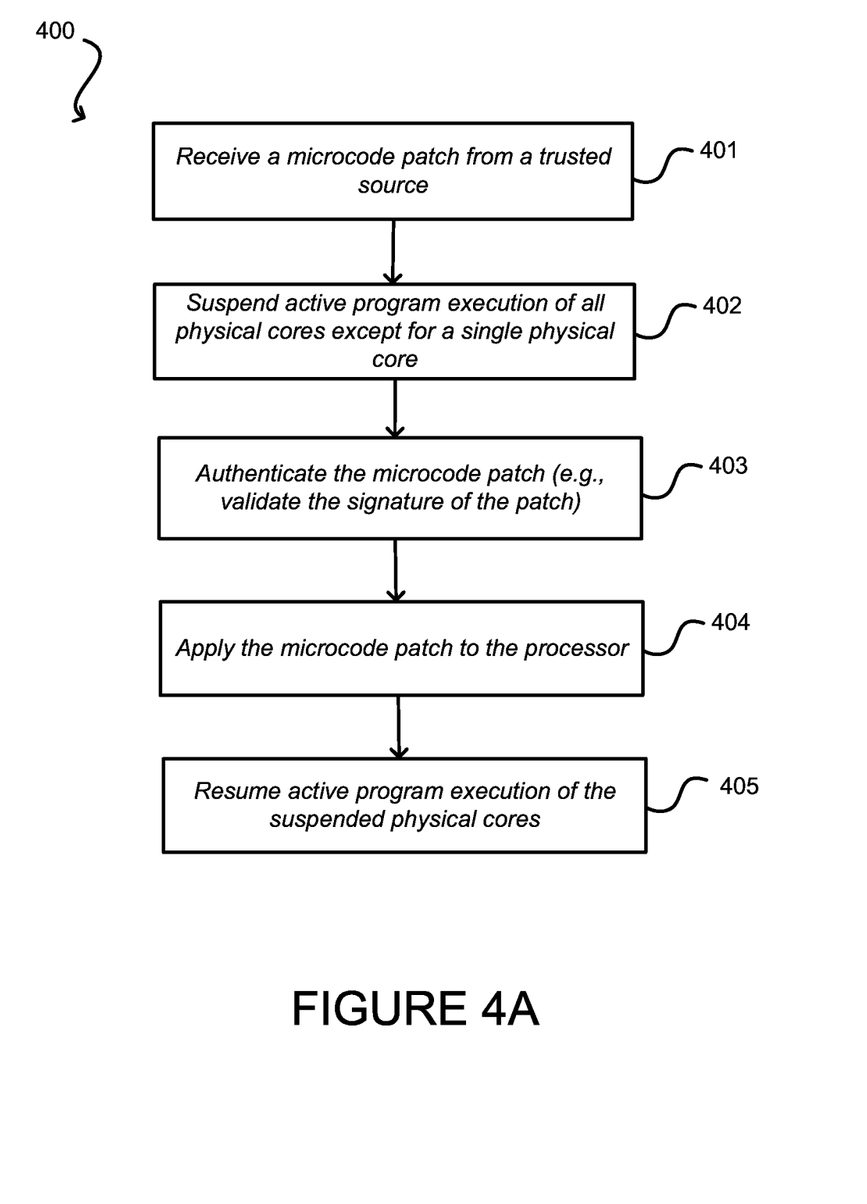
FIG. 4A illustrates an example process for updating the microcode of a processor on a computing device, in accordance with various embodiments.

FIG. 4A illustrates an example process 400 for updating the microcode of a processor on a computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the computing device receives a microcode patch or other update from a trusted source. In various embodiments, the trusted source may include a remote trusted host computing device connected over a network, a device connected over a USB connection, a console on the computing device, among others. For example, the computing device may receive a microcode update from a remote host computing device using a network interface card (NIC). In operation 402, the computing device suspends active program execution in all physical cores of the processor except for a single physical core that will apply the patch, such as a bootstrapping core (Core 0) in the processor. This halt of execution can be performed by entering an isolated execution mode, such as SMM or native processor debug mode, among others.

In operation 403, while operating in the isolated execution mode, the computing device can authenticate the microcode patch. For example, if the microcode patch was signed using a private key, authenticating the microcode patch may include verifying the signature of the microcode patch using a public key. If the microcode patch was encrypted using a public key, authenticating the patch may include decrypting the microcode patch using a private key, such as a key embedded into the processor.

In operation 404, if the microcode patch is successfully authenticated, the computing device applies the microcode patch to the processor. In one embodiment, applying the patch instructs the decoder in the processor to jump to the replacement microcode instructions when decoding instructions during normal execution of the processor. The microcode patch can be stored in RAM or other portion of memory and may be automatically erased in case of power failure and reboot of the host computing device. In operation 405, once the microcode patch has been applied, the computing device may resume active program execution of all physical cores of the processor which were suspended.

Figure 4B:
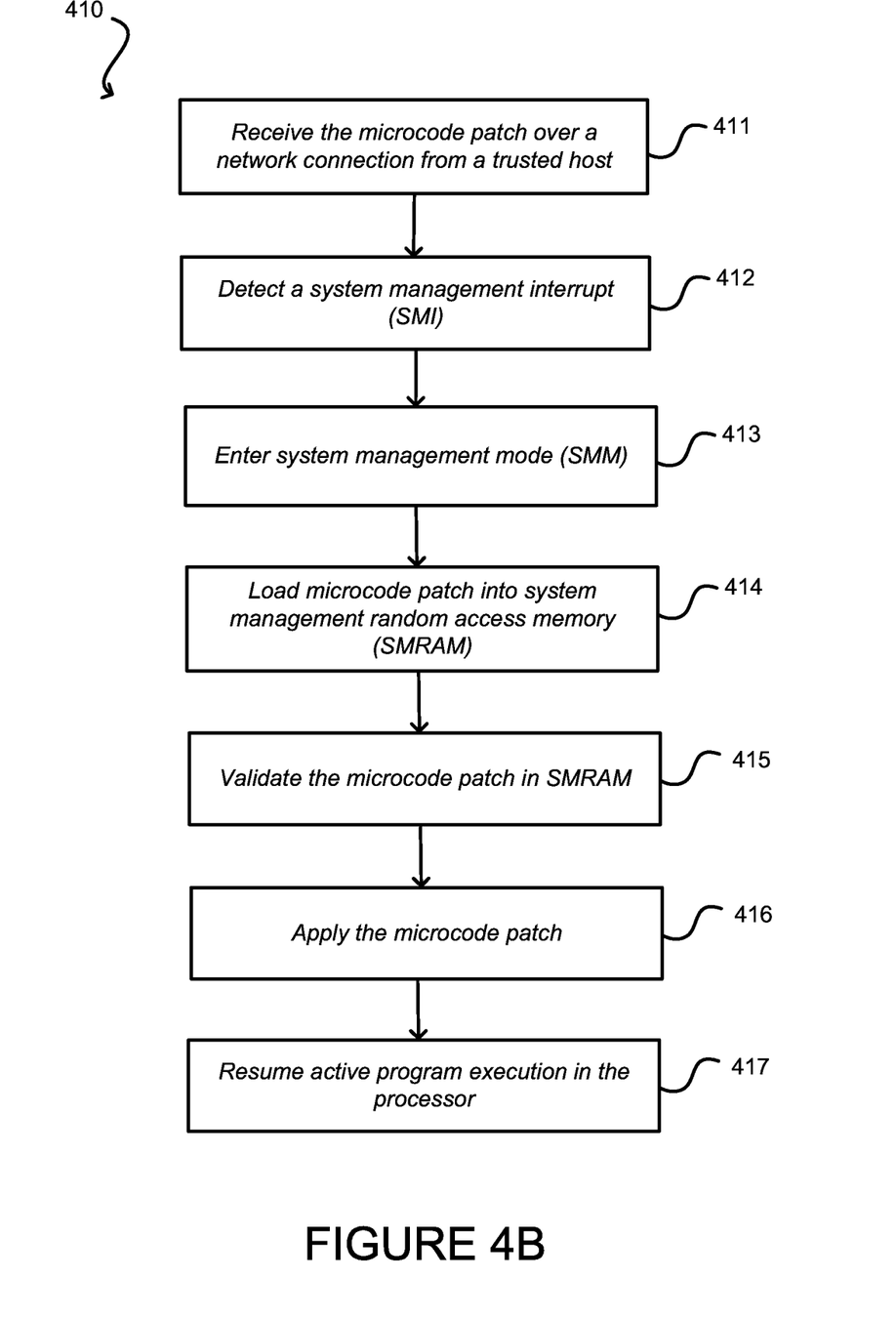
FIG. 4B illustrates an example process for updating the microcode of a processor using a system management mode (SMM), in accordance with various embodiments.

FIG. 4B illustrates an example process 410 for updating the microcode of a processor using a system management mode (SMM), in accordance with various embodiments. In operation 411, a host computing device receives a microcode patch over a network connection from a trusted remote host. In operation 412, the host computing device detects a system management interrupt (SMI). The SMI may be initiated in response to receiving the microcode patch from the trusted remote host. The SMI causes the host computing device to enter the system management mode (SMM), as shown in operation 413. While in SMM, active program execution of all physical cores of the processor are suspended, except for one physical core (e.g., core 0) which will be responsible for validating and loading the microcode patch.

In operation 414, the microcode patch is loaded into system management random access memory (SMRAM) which, in one embodiment, is only accessible in SMM and is inaccessible in all other modes of operation. Once the microcode patch is loaded into SMRAM, the computing device authenticates the microcode patch stored in SMRAM, as shown in operation 415. As previously described, authenticating the microcode patch may include verifying the signature of the patch, decrypting the patch, and the like.

In operation 416, the computing device applies the microcode patch to the processor. Once the patch has been applied, active program execution of the processor can resume, as shown in operation 417. For example, the execution of all suspended physical cores of the processor can resume, using the updated microcode.

Figure 4C:
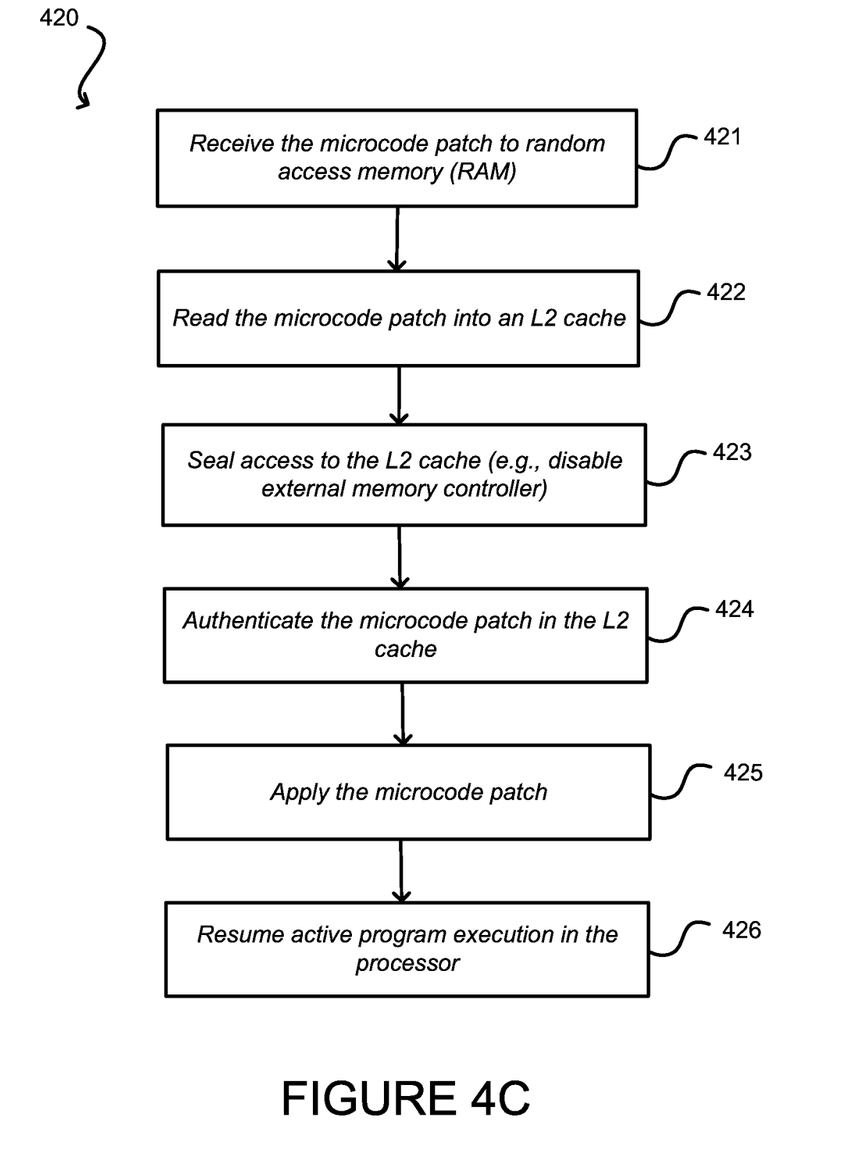
FIG. 4C illustrates an example process for updating the microcode of a processor by loading the microcode patch into a level 2 cache, in accordance with various embodiments.

FIG. 4C illustrates an example process 420 for updating the microcode of a processor by loading the microcode patch into level 2 (L2) cache, in accordance with various embodiments. In operation 421, the microcode patch is received to random access memory (RAM) of the host computing device, as previously described. In operation 422, the microcode patch is loaded into a level 2 (L2) cache. The L2 cache may reside on the motherboard of the host computing device or on the central processing unit (CPU) of the host computing device. In operation 423, the computing device seals off access to the L2 cache. This can be done by disabling the external memory controller, for example.

In operation 424, the microcode patch is authenticated inside the sealed L2 cache. As previously described, authenticating the patch may include verifying the signature of the patch using a public key, decrypting the patch using a private key, or the like. In operation 425, the microcode patch is applied. In operation 426, once the microcode patch is applied, the processor may resume active program execution in all of the physical cores that were suspended.

Figure 5:
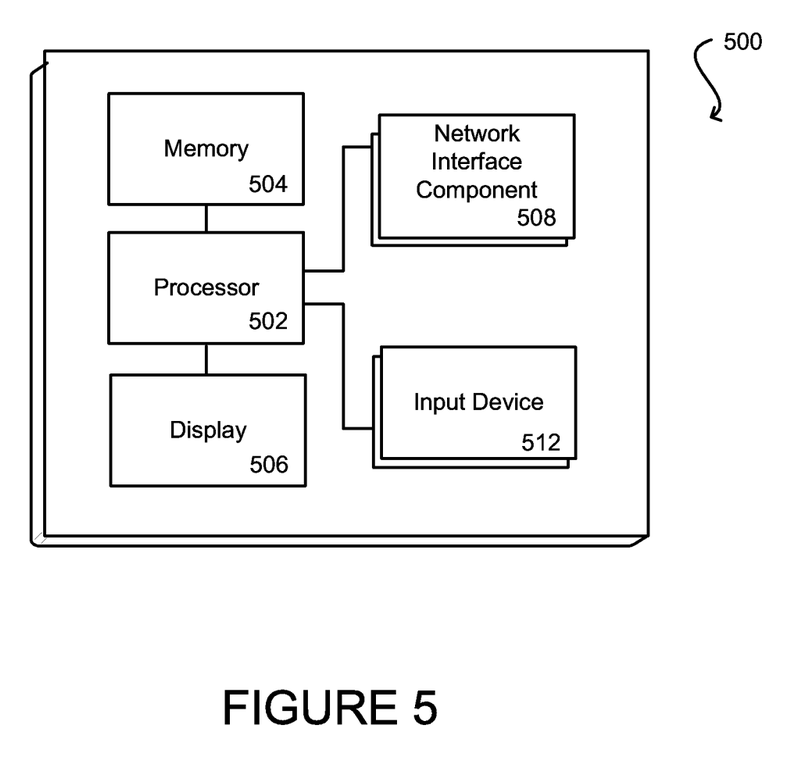
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
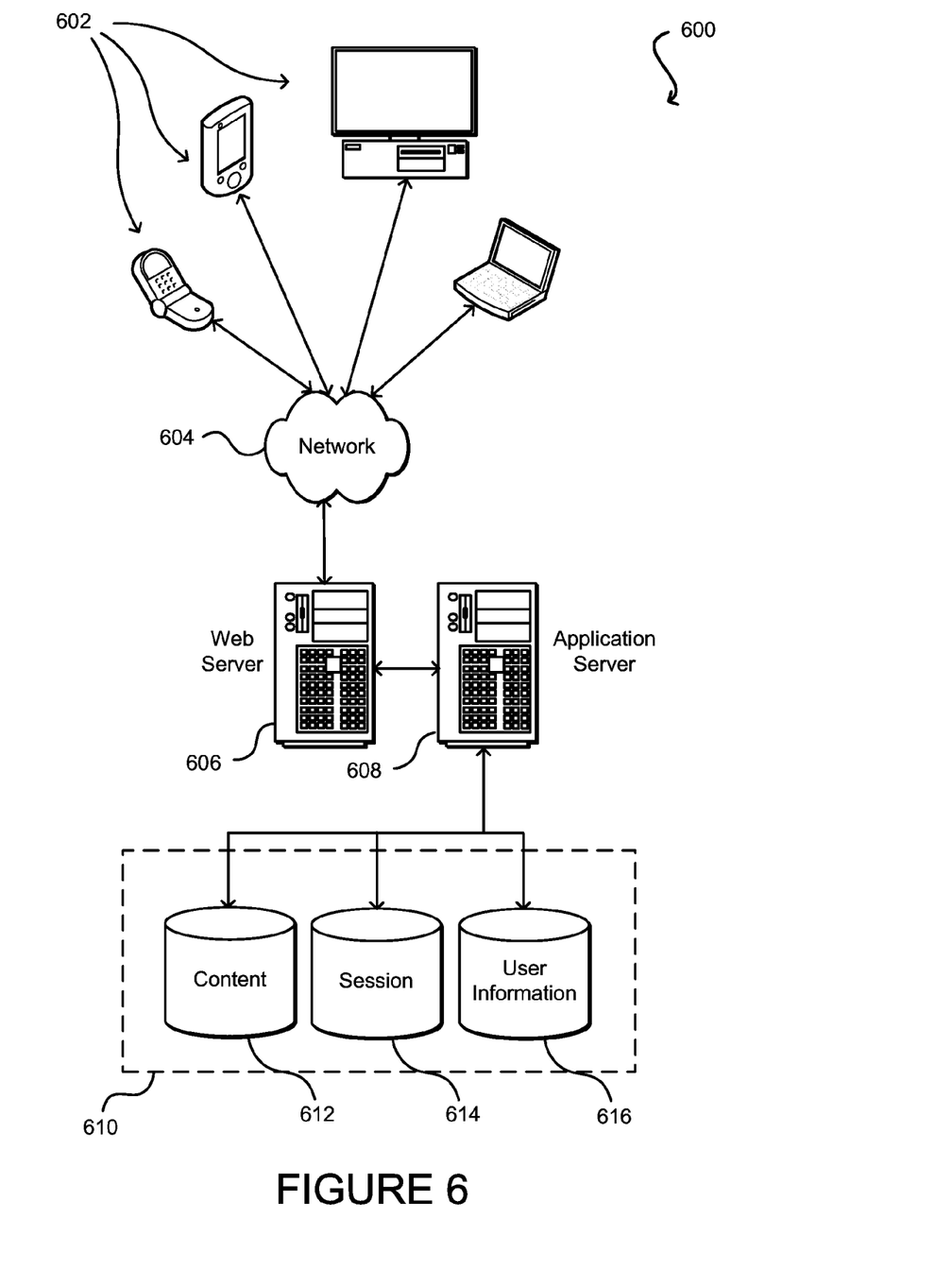
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
    receiving an update to microcode associated with at least one physical processor of a computing device, wherein the computing device comprises a hypervisor hosting one or more virtual machines, the update secured using a key;
    suspending active program execution of all physical cores of the at least one physical processor of the computing device except for a single physical core in the at least one physical processor;
    authenticating, by the single physical core, the update;
    delivering the authenticated update to the at least one physical processor of the computing device;
    applying the authenticated update to the microcode of the at least one physical processor; and
    in response to applying the authenticated update, resuming the active program execution of all physical cores in the at least one physical processor without resetting the hypervisor or the one or more virtual machines of the computing device.

2. The computer implemented method of claim 1, further comprising:
    storing the update in system management random access memory (SMRAM) on the computing device;
    authenticating the update stored in the SMRAM by using a second key; and
    applying the authenticated update to the at least one physical processor of the computing device in response to authenticating the update.

3. The computer implemented method of claim 1, further comprising:
    storing the update in a level 2 cache on the computing device;
    sealing access to the level 2 cache on the computing device;
    authenticating the update in the level 2 cache; and
    applying the authenticated update to the at least one physical processor of the computing device in response to authenticating the update in the level 2 cache.

4. The computer implemented method of claim 1, wherein suspending the active program execution of the at least one physical processor further comprises at least one of:
    entering a system management mode (SMM) in response to detecting a system management interrupt on the computing device; or
    entering a native processor debugging mode of the at least one physical processor of the computing device.

5. The computer implemented method of claim 1, wherein the authenticated update to the microcode is applied without resetting the computing device.

6. The computer implemented method of claim 1, wherein a private key is used to sign the update to the microcode before the update is received to the computing device, and wherein a public key is used to validate a signature of the update of the microcode on the computing device.

7. The computer implemented method of claim 6, wherein the public key used to validate the signature is stored in at least one of: a trusted platform module (TPM) on the computing device or a remote trusted host computing device, and wherein the at least one physical processor contains a third key used to verify the public key.

8. The computer implemented method of claim 1, wherein the update to the microcode further includes:
    one or more replacement microcode instructions and an instruction pointer identifying one or more native microcode instructions that are to be replaced by the one or more replacement microcode instructions on the at least one physical processor.

9. The computer implemented method of claim 8, wherein the one or more replacement microcode instructions are stored in random access memory of the computing device.

10. The computer implemented method of claim 1, wherein receiving the update to the microcode further comprises:
    reading the update to the microcode into memory of the computing device from a remote computing device over a network connection.

11. The computer implemented method of claim 1, wherein the at least one physical processor further includes a hardware decoding unit, wherein during the execution in the at least one physical processor, the hardware decoding unit translates each of a plurality of instructions read from memory into a sequence of microcode instructions to be executed in the at least one physical processor.

12. A computing device, comprising:
    at least one physical processor;
    a hypervisor hosting one or more virtual machines; and
    memory including instructions that, when executed by the at least one physical processor, cause the computing device to:
        receive an update to microcode associated with the at least one physical processor, the update secured using a key;
        suspend active program execution of all physical cores of the at least one physical processor of the computing device except for a single physical core in the at least one physical processor;
        authenticate, by the single physical core, the update;

deliver the authenticated update to the at least one physical processor of the computing device;

apply the authenticated update to the microcode of the at least one physical processor; and in response to applying the authenticated update, resume the active program execution of all physical cores in the at least one physical processor without resetting the hypervisor or the one or more virtual machines of the computing device.

13. The computing device of claim 12, wherein suspending the active program execution of the at least one physical processor further comprises at least one of:

entering a system management mode (SMM) in response to detecting a system management interrupt on the computing device; or entering a native processor debugging mode of the at least one physical processor of the computing device.

14. The computing device of claim 12, wherein the authenticated update to the microcode is applied without resetting the computing device.

15. The computing device of claim 12, further comprising:

a trusted store configured to store a second key used to verify a signature of the update, the signature having been generated using the key.

16. The computing device of claim 15, wherein the at least one physical processor contains a third key used to verify the second key stored in the trusted store.

17. The computing device of claim 12, wherein the update to the microcode further includes:

one or more replacement microcode instructions and an instruction pointer identifying one or more native microcode instructions that are to be replaced by the one or more replacement microcode instructions on the at least one physical processor.

18. A non-transitory computer readable storage medium storing one or more sequences of instructions executed by one or more processors to:

receive an update to microcode associated with a physical processor of a computing device, wherein the computing device comprises a hypervisor hosting one or more virtual machines, the update secured using a key;

suspend active program execution of all physical cores of the physical processor of the computing device;

authenticate the update;

deliver the authenticated update to the physical processor;

apply the authenticated update to the microcode of the physical processor; and in response to applying the authenticated update, resume the active program execution of all physical cores in the physical processor without resetting the hypervisor or the one or more virtual machines of the computing device.

19. The non-transitory computer readable storage medium of claim 18, further comprising instructions executed by the physical processor to:

store the update in system management random access memory (SMRAM) on the computing device;

authenticate the update stored in the SMRAM by using a second key; and apply the authenticated update to the physical processor of the computing device in response to authenticating the update.

20. The non-transitory computer readable storage medium of claim 18, further comprising instructions executed by the physical processor to:

store the update in a level 2 cache on the computing device;

seal access to the level 2 cache on the computing device;

authenticate the update in the level 2 cache; and apply the authenticated update to the physical processor in response to authenticating the update in the level 2 cache.

21. The non-transitory computer readable storage medium of claim 18, wherein receiving the update to the microcode further comprises:

reading the update to the microcode into memory of the computing device from a remote computing device over a network connection.

22. The non-transitory computer readable storage medium of claim 18, wherein suspending the active program execution of the physical processor further comprises at least one of:

entering a system management mode (SMM) in response to detecting a system management interrupt on the computing device; or entering a native processor debugging mode of the physical processor of the computing device.

* * * * *